(12) United States Patent  
Park

(10) Patent No.: US 8,320,742 B2  
(45) Date of Patent: Nov. 27, 2012

(54) METHOD AND APPARATUS FOR PLAYING DATA BETWEEN EXTERNAL DEVICE AND TV SET

(75) Inventor: Hee Young Park, Kyongsangbukdo (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 12/300,326

(22) PCT Filed: May 8, 2007

(86) PCT No.: PCT/KR2007/002247  
§ 371 (c)(1),  
(2), (4) Date: Apr. 27, 2009

(87) PCT Pub. No.: WO2007/129852  
PCT Pub. Date: Nov. 15, 2007

(65) Prior Publication Data  
US 2009/0310943 A1  Dec. 17, 2009

(30) Foreign Application Priority Data  
May 10, 2006  (KR) .................. 10-2006-0041772

(51) Int. Cl.  
H04N 9/80 (2006.01)  
H04N 5/225 (2006.01)  
H04N 5/232 (2006.01)  
H04N 5/765 (2006.01)  
H04N 7/18 (2006.01)  
H04N 9/88 (2006.01)  
G06F 13/00 (2006.01)  
G06F 17/24 (2006.01)  
G06F 17/30 (2006.01)  
G06K 5/00 (2006.01)  
G06K 7/01 (2006.01)  
H04L 9/00 (2006.01)  
H04L 9/30 (2006.01)

(52) U.S. Cl. ........ 386/248; 386/200; 386/239; 386/240; 386/265; 235/380; 235/382; 235/382.5; 348/207.11; 348/211.2; 348/374; 348/375; 380/30; 380/46; 380/277; 711/111; 711/156; 711/170; 711/171; 711/172; 711/173; 715/210; 725/79; 726/18

(58) Field of Classification Search .................. 386/248, 386/200, 239, 240, 265, E5.001; 235/380, 235/382, 382.5; 340/12.32, 310.11; 380/30, 380/46, 277; 700/2, 9, 10, 18, 83, 211; 707/999.009, 999.2; 711/111, 156, 170, 711/171, 172, 173, E12.101; 715/210; 725/79; 726/1, 18; 348/207.11, 211.2, 374, 375  
See application file for complete search history.

(56) References Cited

U.S. PATENT DOCUMENTS 5,201,000 A * 4/1993 Matyas et al. .................. 380/30  
(Continued)

FOREIGN PATENT DOCUMENTS

CN  1540941 A  10/2004  
(Continued)

OTHER PUBLICATIONS

Erdmann et al, "Ipod + Itunes, Passage", pp. 407-444, XP002592487, Nov. 28, 2005.

(Continued)

Primary Examiner — Thai Tran  
Assistant Examiner — Syed Hasan  
(74) Attorney, Agent, or Firm — Birch, Stewart, Kolasch & Birch, LLP

(57) ABSTRACT

An apparatus for recording/reproducing external device data in a broadcast receiver and method thereof are disclosed, by which a broadcast receiver allowed by a certification key is enabled to access a corresponding external device only. The present invention includes a connection checking step of checking a state of a physical connection between an external device and the broadcast receiver, a certification key registration deciding step of deciding whether a reserved certification key is registered, an access allowance deciding step of if the certification key is registered, deciding whether to allow an access to the connected external device by verifying the certification key, and an access allowing step of if the access is allowed, recording/reproducing corresponding data by accessing the connected external device.

20 Claims, 5 Drawing Sheets

U.S. PATENT DOCUMENTS

| | | | |
|---|---|---|---|
| 6,256,060 B1 * | 7/2001 | Wakui | 348/211.2 |
| 6,792,541 B1 * | 9/2004 | Kusakabe et al. | 726/1 |
| 7,110,829 B2 * | 9/2006 | Cunningham et al. | 700/2 |
| 7,337,957 B2 * | 3/2008 | Ashizaki et al. | 235/382 |
| 7,590,331 B2 * | 9/2009 | Horii et al. | 386/248 |
| 7,653,796 B2 * | 1/2010 | Inoue et al. | 711/170 |
| 2003/0121972 A1 * | 7/2003 | Lee et al. | 235/380 |
| 2004/0244032 A1 | 12/2004 | Yamada | |
| 2007/0180369 A1 * | 8/2007 | Connally et al. | 715/526 |

FOREIGN PATENT DOCUMENTS

| | | | |
|---|---|---|---|
| JP | 2003244604 A | * | 8/2003 |
| WO | WO 00/31744 | * | 11/1999 |
| WO | WO 00/31744 A1 | | 6/2000 |
| WO | WO 00/67258 A1 | | 11/2000 |
| WO | WO 2004/081744 A2 | | 9/2004 |
| WO | WO-2004/100003 A2 | | 11/2004 |

OTHER PUBLICATIONS

Scientific Atlanta "Connecting the Explorer 8300TM Digital Video Recorder", pp. 1-20, XP007913107, May 31, 2005.

Hitachi, Ltd, et al., "Digital Transmission Content Protection Specification," vol. 1 (Informational Version), Revision 1.4, XP002377014, Feb. 28, 2005, pp. 1-81.

* cited by examiner

METHOD AND APPARATUS FOR PLAYING DATA BETWEEN EXTERNAL DEVICE AND TV SET

TECHNICAL FIELD

The present invention relates to an apparatus for recording/reproducing external device data in a broadcast receiver and method thereof. Although the present invention is suitable for a wide scope of applications, it is particularly suitable for enabling a broadcast receiver allowed by a certification key to access a corresponding external device only.

BACKGROUND ART

Generally, a recent broadcast receiver is equipped with a large-scale storage device such as a hard disc drive (HDD) and provided with a function of storing/reproducing received broadcast data or external data in/from the hard disc drive.

A product equipped with a hard disc drive is capable of storing or reproducing received broadcast data in direct. The product, which is equipped with a large-scale hard disc drive, is facilitated to record/reproduce data, which was storable via an external device using several video tapes or CDs, in/from the single large-scale hard disc drive.

SUMMARY OF THE INVENTION

However, the related art broadcast receiver is facilitated to store a plurality of pay data stored in an external device using a hard disc drive capable of storing large-scale data, which may give rise to a problem of illegal copying of pay-serviced broadcast data.

Accordingly, the present invention is directed to an apparatus for recording/reproducing external device data in a broadcast receiver and method thereof that substantially obviate one or more problems due to limitations and disadvantages of the related art.

An object of the present invention is to provide an apparatus for recording/reproducing external device data in a broadcast receiver and method thereof, by which a broadcast receiver allowed by a certification key is enabled to access a corresponding external device only.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these objects and other advantages and in accordance with the purpose of the invention, as embodied and broadly described herein, a method of recording/reproducing external device data in a broadcast receiver according to the present invention includes a connection checking step of checking a state of a physical connection between an external device and the broadcast receiver, a certification key registration deciding step of deciding whether a reserved certification key is registered, an access allowance deciding step of if the certification key is registered, deciding whether to allow an access to the connected external device by verifying the certification key, and an access allowing step of if the access is allowed, recording/reproducing corresponding data by accessing the connected external device.

Preferably, after completion of the connection checking step, the method further includes a format deciding step of deciding whether a data format of the external device and a data format of the broadcast receiver are matched, wherein if the data formats are matched, the certification key registration deciding step is executed.

More preferably, the method further includes a formatting step of if the data formats are not matched, formatting the data format of the external device to be matched to the data format of the broadcast receiver.

In this case, after completion of the formatting step, the method further includes a certification key generating step of generating and registering the reserved certification key including numerals, characters, figures and/or a combination thereof.

More preferably, in the format deciding step, it is decided whether the formats are matched according as partition table information and file system version of the broadcast receiver are matched to those of the external device.

Preferably, the method further includes a certification key generating step of if the certification is not registered, generating to register the reserved certification key including numerals, characters, figures and/or a combination thereof.

More preferably, the certification key generating step includes the steps of confirming model numbers, serial numbers, and formatted times of the external device and the broadcast receiver, generating one certification key by combining the confirmed data together, generating a first key and a second key by dividing data of the generated certification key, and registering and storing the generated first key and the generated second key in the broadcast receiver and the external device, respectively.

Preferably, the method further includes an access cutting-off step of if the access is not allowed, cutting off the access to the external device as well as displaying an access unavailable message.

Preferably, in the access allowing step, the data to be recorded or reproduced is encrypted or decrypted to be recorded/reproduced.

Preferably, the access allowing step includes the steps of in case attempting to store the data in the external device, deciding whether to encrypt the data to be stored, if the data is decided to be encrypted to be stored, encrypting and storing the data together with the certification key, in case of attempting to reproduce the stored data, deciding whether to reproduce the encrypted data, and if the encrypted data is decided to be reproduced, decrypting to reproduce the data after verifying the previously stored certification key.

Preferably, the broadcast receiver includes a master key accessible to all kinds of external devices regardless of each of the registered certification keys, the certification keys include intrinsic authentication data, respectively, and the master key includes the intrinsic authentication data included in each of the certification keys.

In another aspect of the present invention, a method of recording/reproducing external device data in a broadcast receiver includes a connection checking step of checking a state of a physical connection between an external device and the broadcast receiver, a format deciding step of deciding whether a data format of the external device and a data format of the broadcast receiver are matched, a certification key registration deciding step of if the data formats are matched, deciding whether a reserved certification key is registered, a formatting step of if the data formats are not matched, formatting the data format of the external device to be matched to the data format of the broadcast receiver, an access allowance deciding step of if the certification key is registered, deciding whether to allow an access to the connected external device by verifying the certification key, a certification key generating step of if the certification is not registered, generating to register the reserved certification key, and an access allowing step of if the access is allowed, recording/reproducing corresponding data by accessing the connected external device.

In another aspect of the present invention, an apparatus for recording/reproducing external device data in a broadcast receiver includes an interface unit physically connecting an external device and the broadcast receiver together and a control unit checking a state of a physical connection between the external device and the broadcast receiver, the control unit deciding whether a reserved certification key is registered, the control unit, if the certification key is registered, deciding whether to allow an access to the connected external device by verifying the certification key, the control unit, if the access is allowed, recording/reproducing corresponding data by accessing the connected external device.

In another aspect of the present invention, an apparatus for recording/reproducing external device data in a broadcast receiver includes an interface unit physically connecting an external device and the broadcast receiver together, a control unit checking a state of a physical connection between the external device and the broadcast receiver, the control unit deciding whether a data format of the external device and a data format of the broadcast receiver are matched, the control unit, if the data formats are matched, deciding whether a reserved certification key is registered, the control unit, if the certification key is registered, deciding whether to allow an access to the connected external device by verifying the certification key, the control unit, if the access is allowed, recording/reproducing corresponding data by accessing the connected external device, a formatting unit, if the data formats are not matched, formatting the data format of the external device to be matched to the data format of the broadcast receiver, and a certification key generating unit generating to register the reserved certification key after completion of the formatting.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR INVENTION

Reference will now be made in detail to the preferred embodiments of the present invention, examples of which are illustrated in the accompanying drawings.

First of all, a digital broadcast receiver of the present invention includes such a device as a television receiver displaying an image by receiving radio waves from a broadcasting station, a set-top box (STB), a personal video recorder (PVR) recording and reproducing video data by loading a hard disc drive (HDD) in a television body, and the like.

In the present invention, an external device includes such a device as a video tape recorder (VTR), a compact disc (CD) player, a digital versatile disc (DVC) player, a digital video express (DVIX) player, and the like.

A reserved recording time correcting apparatus and method in a digital broadcast receiver are explained in detail with reference to the attached drawings as follows.

Figure 1:
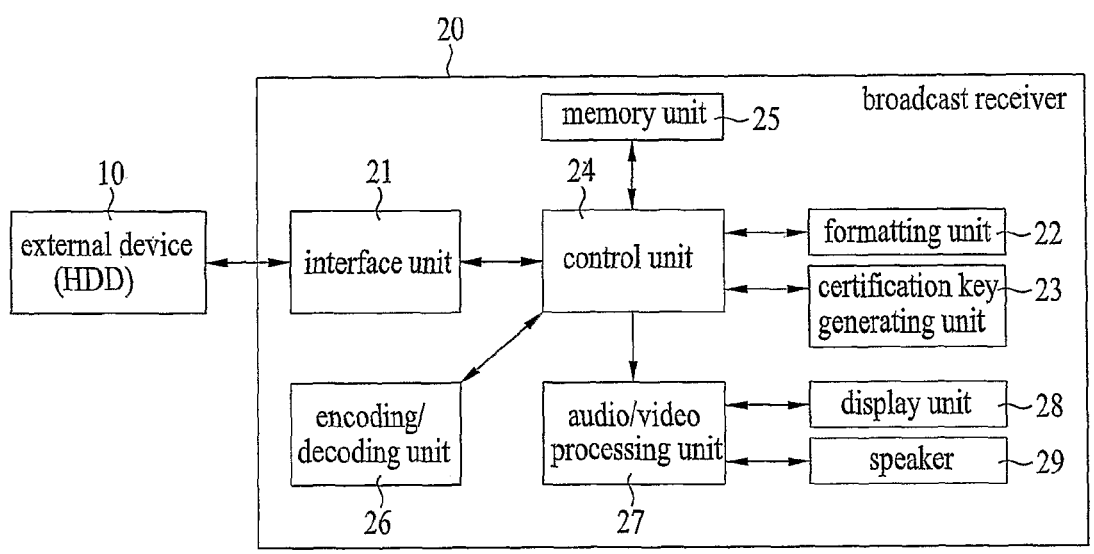
FIG. 1 is a schematic block diagram of an apparatus for reproducing external device data in a broadcast receiver according to one embodiment of the present invention.

FIG. 1 is a schematic block diagram of an apparatus for reproducing external device data in a broadcast receiver according to one embodiment of the present invention.

Referring to FIG. 1, an apparatus for reproducing external device data in a broadcast receiver according to one embodiment of the present invention includes an external device 10 having a storage device such as an HDD and the broadcast receiver 20, e.g., a TV set. And, the broadcast receiver 20 includes an interface unit 21, a formatting unit 22, a certification key generating unit 23, a control unit 24, a memory unit 25, an audio/video processing unit 27, a display unit 28, and a speaker 29.

The interface unit 21 physically connects the external device 10 and the broadcast receiver 20 to each other, receives data inputted from the external device 10, and transfers data outputted from the broadcast receiver 20 to the external device 10.

The formatting unit 22 formats the external device 10 to have the same format of the broadcast receiver 20 according to a user's selection if the broadcast receiver 20 and the external device 10 are decided as differing from each other in format in a manner that the control unit 24 compares their partition table information and file system versions to each other.

If the control unit 24 extracts model number information for the broadcast receiver 20, a serial number of the external device 10, and information for a time at which the formatting unit 22 formats the external device 10 to have the same format of the broadcast receiver 20, the certification key generating unit 23 generates a certification key by combining the extracted information together. The certification key generating unit 23 then provides the generated certification key to the control unit 24.

The control unit 24 checks a state of physical connection between the external device 10 and the broadcast receiver 20 and then decides whether a reserved certification key is registered. If the certification is registered, the control unit 24 verifies the certification key and then decides whether to allow an access to the connected external device. In this case, the certification key includes numerals, characters, figures, and/or combinations thereof.

In case that the access is allowed, the control unit 24 accesses the connected external device to record or reproduce corresponding data.

Once the external device 10 and the broadcast receiver 20 are connected together, the control unit 24 checks an error of the external device 10, compares to decide formats of the broadcast receiver 20 and the external device 10, and then controls the external device 10 to be formatted.

So, if the data formats fail to be matched to each other, the formatting unit 22 formats the external device 10 in a manner of matching the data format of the external device 10 to the data format of the broadcast receiver 20.

The control unit 24 decides whether a certification key registered to the external device 10 is matched to the certification key registered to the broadcast receiver 20. If they are matched to each other, the control unit 24 controls the broadcast receiver 20 accessible to the external device 10.

In case that there do not exist certification keys registered to the external device 10 and the broadcast receiver 20, the control unit 24 controls the certification key generating unit 23 to generate a certification key. The control unit 24 randomly divides the certification key into a first key and a second key. The control unit 24 controls the first key of the certification key to be stored in the memory unit 25 of the broadcast receiver 20 together with the serial number of the external device 10 and controls the second key to be stored in the external device 10.

For this, the certification key generating unit 23 includes a means for confirming model numbers, serial numbers and formatting time of the external device 10 and the broadcast receiver 20, a means for generating one certification key by combining the confirmed data and first and second keys by dividing data of the generated certification key, and a means for registering and storing the generate first and second keys in the broadcast receiver 10 and the external device 20, respectively.

After completion of the connecting confirmation, the control unit 24 decides, whether the data format of the external device 10 and the data format of the broadcast receiver 20 are matched to each other. If the data formats are matched, the control unit 24 decides whether the certification key is registered.

So, if the formats of the external device 10 and the broadcast receiver 20 are not matched to each other and if the formatting of the external device 10 is not accomplished, the control unit 24 displays an access unavailable message, which indicates that an access to the external device 10 is unavailable, and cuts off the access to the external device. Meanwhile, even if the formats are identical, in case that the certification is not generated, the control unit 24 displays that the access to the external device 10 is unavailable.

In case that the access is allowed, the control unit 24 encrypts or decrypts the data to record or reproduce.

In case of allowing the access, the control unit 24 decides whether the data to be stored in the external device 10 is to be encrypted or not. In case of encrypting to store the data, the control unit 24 encrypts and stores the data together with the certification key. In case of attempting to reproduce the stored data, the control unit 24 decides whether to reproduce the encrypted data. In case of deciding to reproduce the encrypted data, the control unit 24 verifies the certification key, decrypts the data, and reproduces the decrypted data.

The memory unit 25 stores the registered certification key, the first key of the certification key divided by the control unit 24, the serial number of the external device 10, and the formatted time information of the external device 10.

The audio/video processing unit 27 displays video data inputted from the external device 10 on the display unit 28 under the control of the control unit 25 and outputs audio data to the speaker 29.

The broadcast receiver 20 is provided with a master key, which enables access to the entire external devices 10, regardless of the registered certification keys in addition. Each of the certification keys includes intrinsic authentication data. And, the master key is provided with the intrinsic authentication data respectively included in the certification keys.

A method of reproducing external device data in the above-configured broadcast receiver according to one embodiment of the present invention is explained with reference to FIGS. 2 to 5 as follows.

Figure 2:
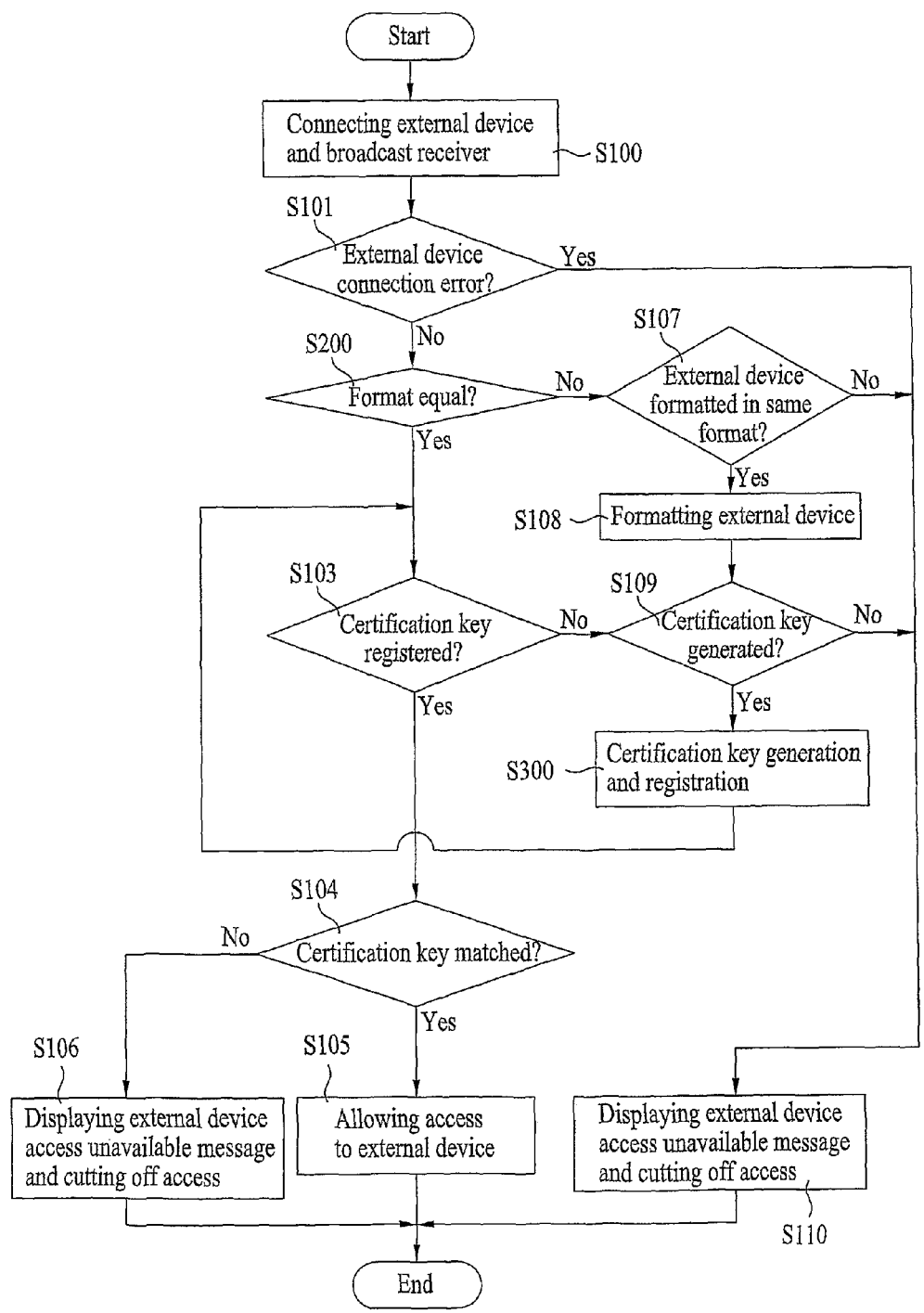
FIG. 2 is a flowchart of a method of reproducing external device data in a broadcast receiver according to one embodiment of the present invention.

FIG. 2 is a flowchart of a method of reproducing data of an external device in a broadcast receiver according to one embodiment of the present invention.

Referring to FIG. 2, the control unit 24 checks a state of a physical connection between the external device (HDD) 10 and the broadcast receiver 20 (S100).

In the case, the state of the physical connection between the external device (HDD) 10 and the broadcast receiver 20 corresponds to a wire connection system using various cables or a wireless connection system using RF, IR (infrared) or the like.

Subsequently, an error of the external device 10 is decided (S101). If the error does not exist, a format of the broadcast receiver 20 and a format of the external device 10 connected to the broadcast receiver 20 are compared to each other (S102).

In particular, a process for deciding whether the formats of the broadcast receiver 20 and the external device 10 are matched to each other is explained with reference to FIG. 3 as follows.

Figure 3:
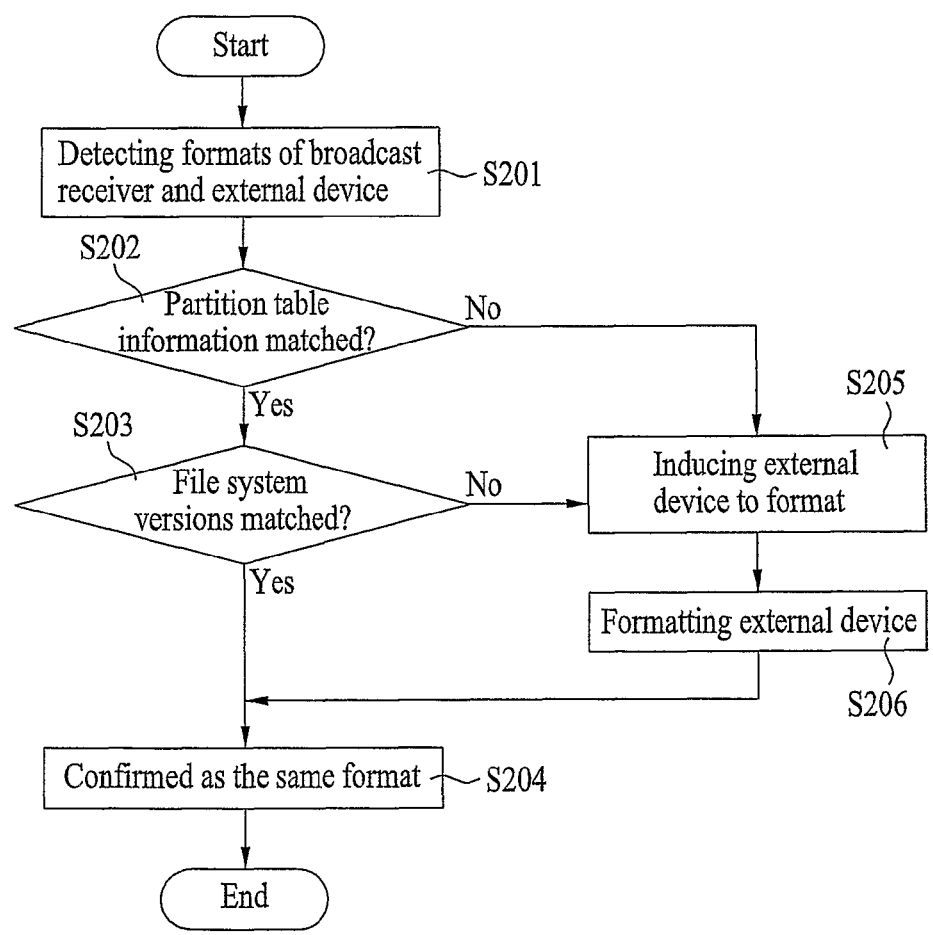
FIG. 3 is a flowchart of a process for deciding a data format of an external device and a data format of a broadcast receiver.

FIG. 3 is a flowchart of a process for deciding a data format of an external device and a data format of a broadcast receiver.

Referring to FIG. 3, the control unit 24 detects a format of the broadcast receiver 20 and a format of the external device 10 connected to the broadcast receiver 20 (S200).

Subsequently, the control unit 24 checks whether partition table information for the broadcast receiver 20 in the detected format is matched to partition table information for the external device 10 in the detected format (S201).

If both of the partition table information is matched, the control unit 24 checks whether file system versions are matched to each other (S202).

If the file system versions are matched, it is confirmed as the same format (S203). A next step is then executed.

On the other hand, if the broadcast receiver 20 and the external device 10 differ from each other in at least one of the partition table information and the file system version, the control unit 24 confirms that the format of the broadcast receiver 20 differs from that of the external device 10 and then induces the external device 10 to be formatted (S107, S204).

If a format signal of the external device is inputted from a user, the formatting unit 22 formats the external device 10 to have the same format of the broadcast receiver 20 (S108, S205).

If a format signal of the external device is not inputted from a user, the control unit 24 displays a message indicating inaccessibility to the external device 10 (S112).

Meanwhile, if the formats of the broadcast receiver 20 and the external device 10 are decided equal to each other, the control unit 24 decides whether a certification key is set and registered to the external device 10 connected to the broadcast receiver 20 (S103).

In this case, the certification key in the certification deciding step is the reserved key that is divided and stored in the memory unit 25 of the broadcast receiver 20 and the external device 10. And, the certification key in the certification deciding step is used in deciding whether to exist in each of the broadcast receiver 20 and the external device 10.

As a result of the decision, if the certification key is set and registered to each of the broadcast receiver 20 and the external device 10, the control unit 24 checks whether a first key of the certification key divided and stored in the broadcast receiver 20 is matched to a second key of the certification key divided and stored in the external device 10. And, the control unit 24 checks a serial number of the external device 10 stored in the broadcast receiver 20 as well (S104).

Subsequently, if the certification key is confirmed through the first key stored in the broadcast receiver 20 and the second key stored in the external device 10, the broadcast receiver 20 is allowed to access the external device 10 (S105).

Meanwhile, if the certification key is not set and registered to each of the broadcast receiver 20 and the external device 10, the control unit 24 decides whether to generate a certification key (S109). As a result of the decision, if a request for generating a certification key is inputted from a user, the certification generating unit 23 generates a certification key.

A process for generating a certification key from the certification key generating unit 23 is explained with reference to FIG. 4 as follows.

Figure 4:
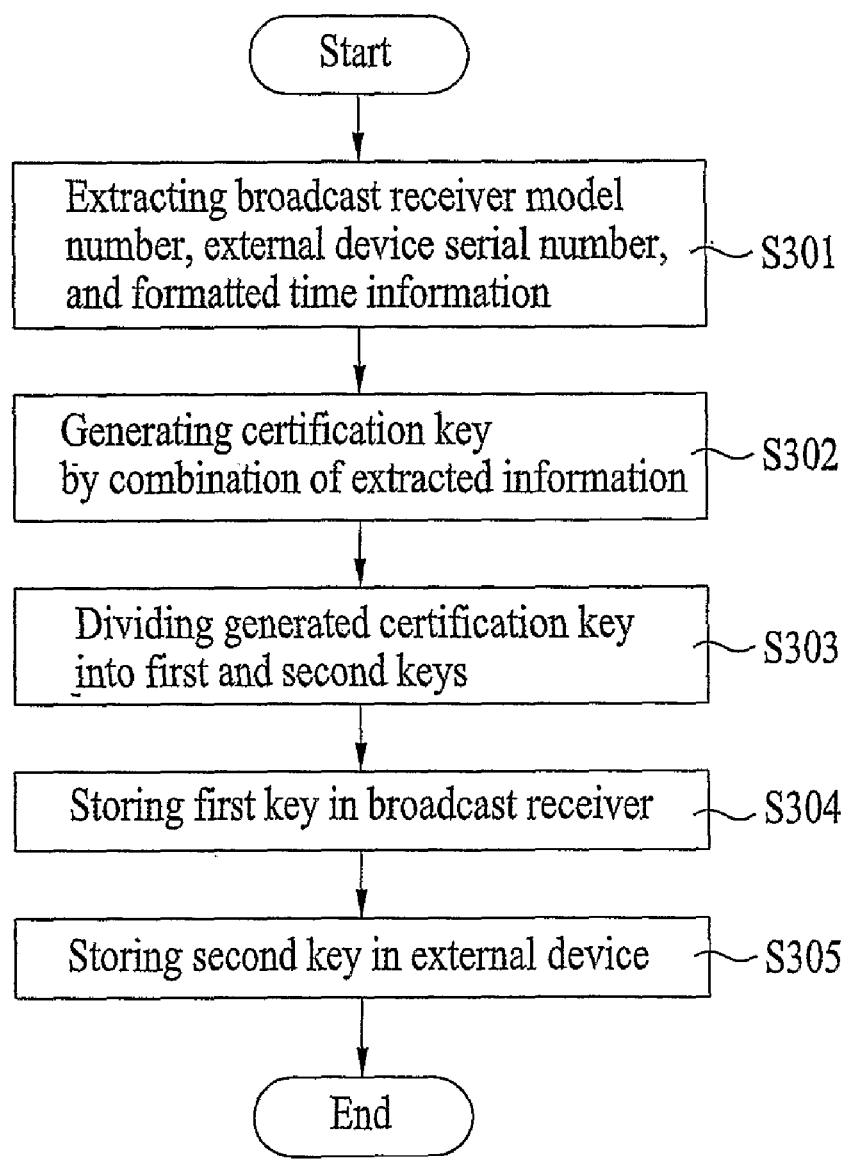
FIG. 4 is a flowchart of a process for generating a certification key to allow an access of an external device described in FIG. 2.

FIG. 4 is a flowchart of a process for generating a certification key to allow an access of an external device described in FIG. 2.

Referring to FIG. 4, the certification key generating unit 23 extracts module number information for the broadcast receiver 20 and a serial number of the external device 10. If both of the external device 10 and the broadcast receiver 20 are formatted in the same format, the certification key generating unit 23 extracts formatted time information (S301).

The certification key generating unit 23 then generates a certification key by combining the extracted model number of the broadcast receiver 20, the serial number of the external device 10, and the extracted formatted time information together (S302).

The generated certification key is randomly divided into a first key and a second key by the control unit 24 (S110, S303).

The first key of the divided certification key is stored in the memory unit 25 of the broadcast receiver 20 together with the serial number of the external device 10 (S304). The second key is stored in the external device 10 (S111, S305).

The broadcast receiver 20 then accesses the external device 10 to receive data (S105).

On the other hand, if the certification keys set and registered to the broadcast receiver 20 and the external device fail to be matched to each other or if a certification key is not generated, the control unit 24 provides a message indicating that an access to the external device 10 is unavailable (S106, S112).

Thus, in case of connecting the broadcast receiver 20 to the external device 10 to output and reproduce the data stored in the external device 10, the access to the external device 10 is allowed according to a result of checking whether the certification keys respectively set and registered to the receiver and device are matched to each other. Hence, it is able to prevent reckless use of contents or illegal copying of pay contents data.

Moreover, inputted contents data is encrypted by the control unit 24 and then stored in the external device 10. And, the corresponding contents are decrypted and executed by the broadcast receiver 20 having controlled the encryption only. Hence, the illegal copying can be perfectly cut off.

As mentioned in the foregoing description, after the data has been encrypted and stored in the external device, a process for outputting the stored data to be reproduced by the broadcast receiver is explained with reference to FIG. 5 as follows.

Figure 5:
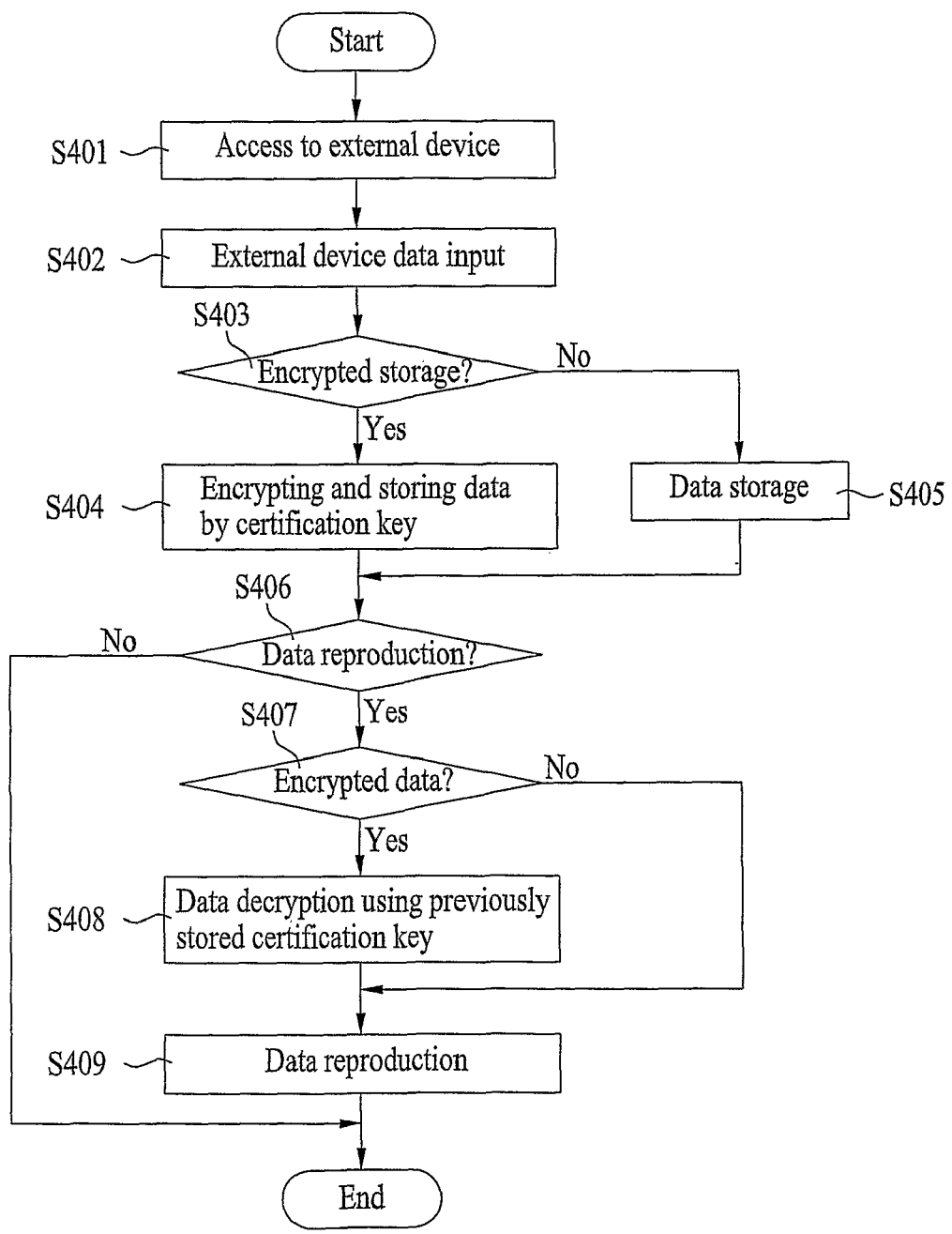
FIG. 5 is a flowchart of a process for data encryption, storage, and reproduction between an external device and a broadcast receiver according to another embodiment of the present invention.

FIG. 5 is a flowchart of a process for data encryption, storage, and reproduction between an external device and a broadcast receiver according to another embodiment of the present invention.

Referring to FIG. 5, as the external device 10 and the broadcast receiver 20 are connected to each other, the access to the external device 10 is allowed (S401).

If data is inputted to the external device 10 (S402), the control unit 24 checks whether to encrypt and store the inputted contents (S403).

If a signal for encrypting and storing the inputted data is inputted to the external device 10 by a user, the control unit 24 encrypts the inputted data according to the first key previously stored in the broadcast receiver 20 and then stores the encrypted data in the external device 10 (S404).

Subsequently, if a reproducing signal of the data stored in the external device 10 is inputted by the user (S406), it is decided whether the data selected for reproduction is the encrypted and stored data (S407).

As a result of the deciding step S407, if the selected data is the encrypted data, the control unit 24 compares the first key previously stored in the memory unit 25 of the broadcast receiver 20 to the information for the encrypted and stored data. If a first key number exists in the encrypted data, the control unit 24 controls the corresponding data to be decrypted (S408) and outputted (S409).

On the other hand, if the data inputted to the external device 10 is not encrypted and stored, it is normally stored for reproduction in the external device 10 (S405).

Thus, the accessibility of the broadcast receiver 20 to the external device 10 is restricted using the certification key. The data stored in the external device 10 is encrypted and stored. In case that the encrypted and stored data is outputted to the broadcast receiver 20, the corresponding data can be outputted only if the information for the encrypted data is matched to the registered key information previously stored in the broadcast receiver 20. Hence, one broadcast receiver 20 is able to access one external device 10 only, whereby illegal copying and reproduction of the stored contents.

Regardless of the certification key registered to the external device 10, the broadcast receiver 20 having the certification key accessible to the external device 10 can access all external devices 10, thereby controlling the external devices 10 having technical difficulty without a key confirmation procedure.

Regardless of the certification key divided and registered to the external device 10, the broadcast receiver 20 can be provided with the masker key accessible to all external devices 10.

In particular, each of the certification keys includes intrinsic authentication data and the master key includes the entire intrinsic authentication data included in the respective certification keys. Hence, in case of after-service or device check for the technical difficulty of the external device 10 or the like, the corresponding access is facilitated to correct errors.

INDUSTRIAL APPLICABILITY

In the description for one embodiment of the present invention, the data reproducing device connected to the external device includes the broadcast receiver. And, the present invention is applicable to various kinds of video display devices capable of reproducing data stored in an external device.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of recording and reproducing external device data in a broadcast receiver, the method comprising:
a connection checking step of checking a state of a physical connection between an external device and the broadcast receiver;
a certification key registration deciding step of deciding whether a reserved certification key is registered;
a certification key generating step of, if a certification key is not registered, generating a new certification key;
a registering and storing step of registering the new certification key by generating a first key and a second key by dividing data of the generated new certification key, wherein the first key and second key are divided to be recognizable as originating from the same new certification key when later compared, and storing the generated first key and the generated second key in the broadcast receiver and the external device, respectively;
an access allowance deciding step of if the certification key is registered, deciding whether to allow an access to the connected external device by verifying the certification key;
an access allowing step of if the access is allowed, recording and reproducing corresponding data by accessing the connected external device; and
a recording and reproducing determining step of determining whether data stored on the broadcast receiver is to be recorded onto the external device, or whether data from the external device is to be reproduced by the receiver.

2. The method of claim 1, after completion of the connection checking step, the method further comprising a format deciding step of deciding whether a data format of the external device and a data format of the broadcast receiver are matched,
wherein if the data formats are matched, the certification key registration deciding step is executed.

3. The method of claim 2, further comprising a formatting step of if the data formats are not matched, formatting the data format of the external device to be matched to the data format of the broadcast receiver.

4. The method of claim 3, after completion of the formatting step, the certification key generating step generates and registers the reserved certification key including numerals, characters, figures and/or a combination thereof.

5. The method of claim 2, wherein in the format deciding step, it is decided whether the formats are matched according as partition table information and file system version of the broadcast receiver are matched to those of the external device.

6. The method of claim 1, further comprising an access cutting-off step of if the access is not allowed, cutting off the access to the external device as well as displaying an access unavailable message.

7. The method of claim 1, wherein in the access allowing step, the data to be recorded or reproduced is encrypted or decrypted to be recorded and reproduced.

8. The method of claim 1, the access allowing step comprising the steps of:
in case attempting to store the data in the external device, deciding whether to encrypt the data to be stored;
if the data is decided to be encrypted to be stored, encrypting and storing the data together with the certification key;
in case of attempting to reproduce the stored data, deciding whether to reproduce the encrypted data; and
if the encrypted data is decided to be reproduced, decrypting to reproduce the data after verifying the previously stored certification key.

9. The method of claim 1, wherein the broadcast receiver includes a master key accessible to all kinds of external devices regardless of each of the registered certification keys,
wherein the certification keys include intrinsic authentication data, respectively, and
wherein the master key includes the intrinsic authentication data included in each of the certification keys.

10. An apparatus for recording and reproducing external device data in a broadcast receiver, comprising:
an interface unit physically connecting an external device and the broadcast receiver together; and
a control unit checking a state of a physical connection between the external device and the broadcast receiver, the control unit deciding whether a reserved certification key is registered, the control unit, if the certification key is registered, deciding whether to allow an access to the connected external device by verifying the certification key and if a certification key is not registered, generating a new certification key, the control unit, if the access is allowed, recording and reproducing corresponding data by accessing the connected external device,
wherein the control unit further generates the new certification key by generating a first key and a second key by dividing data of the generated new certification key, wherein the first key and second key are divided to be recognizable as originating from the same new certification key when later compared, and stores the generated first key and the generated second key in the broadcast receiver and the external device, respectively.

11. The apparatus of claim 10, wherein the control unit, after completion of the connection check, decides whether the data format of the external device and the data format of the broadcast receiver are matched, and
wherein if the data formats are matched, the control unit decides whether the certification key is registered.

12. The apparatus of claim 11, if the data formats are not matched, the apparatus further comprising a formatting unit formatting the data format of the external device to be matched to the data format of the broadcast receiver.

13. The apparatus of claim 12, further comprising a certification key generating unit generating and storing the reserved certification key after completion of the formatting.

14. The apparatus of claim 11, wherein the control unit, in case of deciding the formats, decides whether the formats are matched according as partition table information and file system version of the broadcast receiver are matched to those of the external device.

15. The apparatus of claim 10, further comprising a certification generating unit generating and registering the reserved certification key if the certification key is not registered.

16. The apparatus of claim 15, the certification key generating unit confirms model numbers, serial numbers, and formatted times of the external device and the broadcast receiver.

17. The apparatus of claim 10, wherein the control unit, if the access is not allowed, cuts off the access to the external device as well as displays an access unavailable message.

18. The apparatus of claim 10, wherein if the access is allowed, the control unit encrypts or decrypts the data to be recorded or reproduced and then records/reproduces the encrypted or decrypted data.

19. The apparatus of claim 10, wherein the control unit, in case of attempting to store the data in the external device, decides whether to encrypt the data to be stored,
- wherein the control unit, if the data is decided to be encrypted to be stored, encrypts and stores the data together with the certification key,
- wherein the control unit, in case of attempting to reproduce the stored data, decides whether to reproduce the encrypted data, and
- wherein the control unit, if the encrypted data is decided to be reproduced, decrypts to reproduce the data after verifying the previously stored certification key.

20. The apparatus of claim 10, wherein the broadcast receiver includes a master key accessible to all kinds of external devices regardless of each of the registered certification keys,
- wherein the certification keys include intrinsic authentication data, respectively, and
- wherein the master key includes the intrinsic authentication data included in each of the certification keys.

* * * * *